United States Patent
Anderson et al.

(10) Patent No.: US 8,425,667 B2
(45) Date of Patent: Apr. 23, 2013

(54) SYSTEM AND METHOD FOR MULTIPHASE PUMP LUBRICATION

(75) Inventors: David Deloyd Anderson, Glenville, NY (US); Vasanth Srinivasa Kothnur, Clifton Park, NY (US); Hrishikesh Vishvas Deo, Saratoga Springs, NY (US); Johan Kristian Sveen, Baerum (NO); Ove Saele, Asker (NO)

(73) Assignee: General Electric Company, Niskayuna, NY (US)

( * ) Notice: Subject to any disclaimer, the term of this patent is extended or adjusted under 35 U.S.C. 154(b) by 145 days.

(21) Appl. No.: 12/873,168

(22) Filed: Aug. 31, 2010

(65) Prior Publication Data

US 2012/0048113 A1    Mar. 1, 2012

(51) Int. Cl.
*B01D 19/00* (2006.01)

(52) U.S. Cl.
USPC .................. 95/259; 95/260; 95/261; 96/215; 96/216; 96/209; 184/6.23; 186/357

(58) Field of Classification Search .............. 95/253, 95/260, 261, 259; 96/215, 216, 209, 204; 184/6.23, 6.24; 166/357
See application file for complete search history.

(56) References Cited

U.S. PATENT DOCUMENTS

| | | | |
|---|---|---|---|
| 6,457,950 | B1 | 10/2002 | Cooper et al. |
| 7,152,681 | B2 | 12/2006 | Olsen et al. |
| 7,152,682 | B2 | 12/2006 | Hopper |
| 2004/0144534 | A1 * | 7/2004 | Lee ................................ 166/265 |
| 2009/0098003 | A1 | 4/2009 | Kothnur et al. |
| 2010/0278672 | A1 | 11/2010 | Kothnur et al. |
| 2010/0278673 | A1 | 11/2010 | Kothnur et al. |
| 2011/0233144 | A1 * | 9/2011 | McCabe .................. 210/748.16 |

FOREIGN PATENT DOCUMENTS

WO    WO2007140151    12/2007

OTHER PUBLICATIONS

U.S. Appl. No. 12/612,005, filed Nov. 4, 2009, Vasanth Kothnur.
U.S. Appl. No. 12/786,946, filed May 26, 2010, David Deloyd Anderson.
http://www.ensysenergy.com/EYI%20Files/GOSPSIM%20Technical%20Description.pdf; ENSYS Yocum Inc., Multiphase Flow Technology, *GOSPSIM 3.3—Technical Description*, 32 pages (undated).

* cited by examiner

*Primary Examiner* — Duane Smith
*Assistant Examiner* — Douglas Theisen
(74) *Attorney, Agent, or Firm* — Andrew J. Caruso

(57) ABSTRACT

A subsea system includes a multiphase pump, configured to transfer a multiphase fluid and a multiphase separator, configured to separate the multiphase fluid into solid, liquid, and gaseous phases. The multiphase separator includes a solid-liquid separation device, which is configured to facilitate separation of the solid phase and the liquid phase from the multiphase fluid. The multiphase separator includes a gas-liquid separation device, which is configured to facilitate separation of the gaseous phase and the liquid phase from the multiphase fluid. The multiphase separator includes a liquid reservoir, which is configured to contain a volume of the liquid phase to be used as a lubricant for the multiphase pump. Finally, the multiphase separator includes a liquid outlet, which is configured to transfer the liquid phase from the liquid reservoir to the multiphase pump.

16 Claims, 7 Drawing Sheets

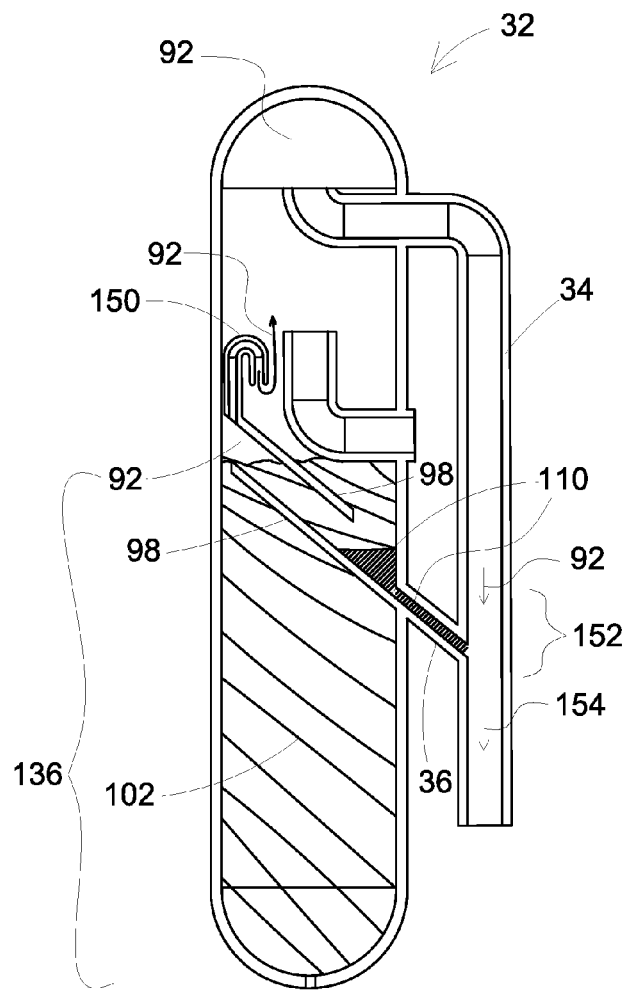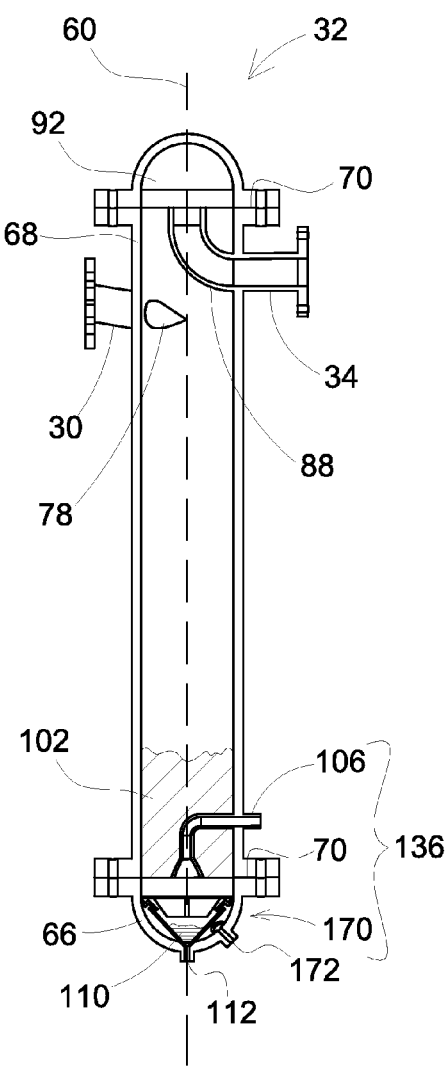
Fig. 5
Fig. 6

SYSTEM AND METHOD FOR MULTIPHASE PUMP LUBRICATION

BACKGROUND OF THE INVENTION

The subject matter disclosed herein relates to a screw pump, and more particularly to the lubrication of a multiphase screw pump.

Screw pumps are rotary, positive displacement pumps that use two or more screws to transfer high or low viscosity fluids or fluid mixtures along an axis. A twin screw pump typically has two intermeshing counter-rotating rotor screws. The volumes or cavities between the intermeshing screws and a liner or casing transport a specific volume of fluid in an axial direction around threads of the screws. As the screws rotate, the fluid volumes are transported from an inlet to an outlet of the pump. In some applications, twin screw pumps are used to aid in the extraction of oil and gas from on-shore and subsea wells.

In many cases, a twin screw pump may be used to pump a multiphase fluid from a subsea well, which may be processed to produce petroleum products. Accordingly, twin screw pumps may be configured to prevent the flow of process fluids into the bearings, timing gears, motor, environment, or the like. In particular, twin screw pumps may utilize a shaft seal on each end of each rotor. The shaft seals typically require the usage of a lubricant flush system that maintains the rub surfaces of the sealing system clean and removes heat from the sealing surfaces. In addition, the lubricant flush system may be used to lubricate and cool the bearings and timing gears of the twin screw pump. Such a lubricant flush system may require additional components and maintenance, which adds costs and maintenance to the screw pump system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a subsea system includes a multiphase pump configured to transfer a multiphase fluid, and a multiphase separator configured to separate the multiphase fluid into solid, liquid, and gaseous phases. The multiphase separator includes a multiphase fluid inlet coupled to a shell. The multiphase fluid inlet is configured to receive the multiphase fluid from the multiphase pump. The multiphase separator further includes a solid-liquid separation device disposed in the shell. The solid-liquid separation device is configured to facilitate separation of the solid phase and the liquid phase from the multiphase fluid. The multiphase separator further includes a gas-liquid separation device disposed in the shell. The gas-liquid separation device is configured to facilitate separation of the gaseous phase and the liquid phase from the multiphase fluid. The multiphase separator further includes a liquid reservoir disposed in the shell. The liquid reservoir is configured to contain a volume of the liquid phase to be used as a lubricant for the multiphase pump. Finally, the multiphase separator includes a liquid outlet coupled to the shell. The liquid outlet is configured to transfer the liquid phase from the liquid reservoir to the multiphase pump.

In a second embodiment, a subsea system includes a multiphase separator configured to separate a multiphase fluid into solid, liquid, and gaseous phases. The multiphase separator includes a multiphase fluid inlet coupled to a shell. The multiphase fluid inlet is configured to receive the multiphase fluid from the multiphase pump. The multiphase separator further includes a solid-liquid separation device disposed in the shell. The solid-liquid separation device is configured to facilitate separation of the solid phase and the liquid phase from the multiphase fluid. The multiphase separator further includes a gas-liquid separation device disposed in the shell. The gas-liquid separation device is configured to facilitate separation of the gaseous phase and the liquid phase from the multiphase fluid. The multiphase separator further includes a liquid reservoir disposed in the shell. The liquid reservoir is configured to contain a volume of the liquid phase to be used as a lubricant for the multiphase pump. Finally, the multiphase separator includes a liquid outlet coupled to the shell. The liquid outlet is configured to transfer the liquid phase from the liquid reservoir to the multiphase pump.

In a third embodiment, a method of operating a subsea system includes transferring a multiphase fluid from an outlet of a multiphase pump to an inlet of a multiphase separator, facilitating separation of a solid phase and a liquid phase from the multiphase fluid using a solid-liquid separation device disposed in a shell of the multiphase separator, facilitating separation of a gas phase and the liquid phase from the multiphase fluid using a gas-liquid separation device disposed in the shell of the multiphase separator, maintaining a volume of the liquid phase in a liquid reservoir disposed in the shell of the multiphase separator, transferring the liquid phase from the liquid reservoir to lubricated components of the multiphase pump, and lubricating the lubricated components of the multiphase pump with the liquid phase.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 is a cross-sectional view of a separator with an eductor in accordance with an embodiment of the present technique;

FIG. 6 is a cross-sectional view of a separator with a solid separation cone system in accordance with an embodiment of the present technique;

DETAILED DESCRIPTION OF THE INVENTION

Figure 1:
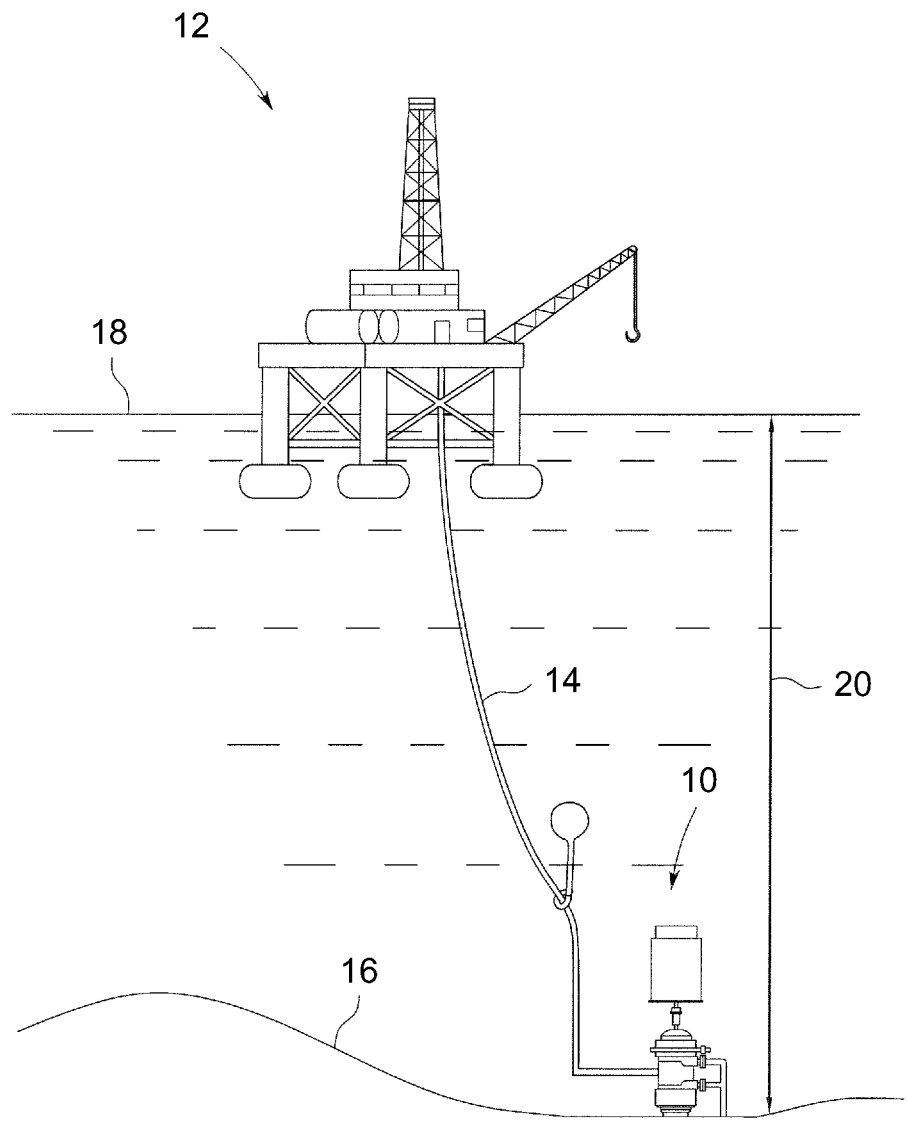
FIG. 1 is a diagrammatical representation of a screw pump system and a production platform in accordance with an embodiment of the present technique.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

FIG. 1 is a schematic diagram of a screw pump system 10 that may be provided with a production platform 12 to pump a fluid for processing, storage and/or transport. As depicted, the screw pump system 10 may be connected to the production platform 12 via a conduit or riser 14 that may be used to route a process fluid to the platform. The process fluid may be a multiphase fluid, such as raw petroleum based fluid from a subsea drilling rig, which may include two or three of solid, liquid, and/or gas phases. In the following discussion, unless specified otherwise, when referring to a stream by a single phase, the stream may include additional phases. For example, a stream referred to as a "solid phase" may include mostly solids, but may also include liquids, gases, or combinations thereof. Similarly, a stream referred to as a "liquid phase" may include mostly liquids, but may also include solids, gases, or combinations thereof. In addition, the screw pump system 10 may be located on a sea or ocean floor 16, wherein the screw pump system 10 pumps the process fluid to a production platform floating on an ocean surface 18, or anchored to the sea floor. As depicted, the screw pump system 10 may be located a distance 20 from the production platform 12, wherein the pump is used to create the pressure and force used to pump the process fluid to the surface 18. In another embodiment, the screw pump system 10 may be located in a factory or chemical plant and may be configured to direct a multiphase process fluid to holding tanks or other structures for processing or storage. In the illustrated example, the screw pump system 10 may be useful during the extraction of oil and/or gas from subsea wells, to reduce back pressure and assist in the extraction of the oil and/or gas. In the depicted embodiment, the screw pump system 10 uses two intermeshing screws to pump the process fluid. These intermeshing screws form a screw pump, which may be referred to as a twin screw pump.

The screw pump system 10 includes several components that may require lubrication and may be susceptible to wear because of exposure to particulate matter within the process fluid. Specifically, the screws within the screw pump system 10 may be coupled to bearings that require lubrication in order to perform properly and avoid breakdown. In addition, other components of the screw pump system 10, such as timing gears and/or seals, may require lubrication. The lubrication of pump bearings may be achieved by routing the multiphase process fluid through a circuit of conduits and a system for separating particulates from the process fluid. The process fluid may lubricate the components within the screw pump system 10 after the process fluid has been treated, routed and directed to locations within the screw pump system 10 to make it suitable for lubrication of the pump components. By using the process fluid for lubrication instead of a separate non-process lubricant, the requirement for an umbilical to transport lubricant from the production platform 12 to the screw pump system 10 may be reduced or omitted. Thus, embodiments of the screw pump system 10 using process fluid for lubrication may have a high pressure boost capability and may be simple, compact, inexpensive, and reliable.

Figure 2:
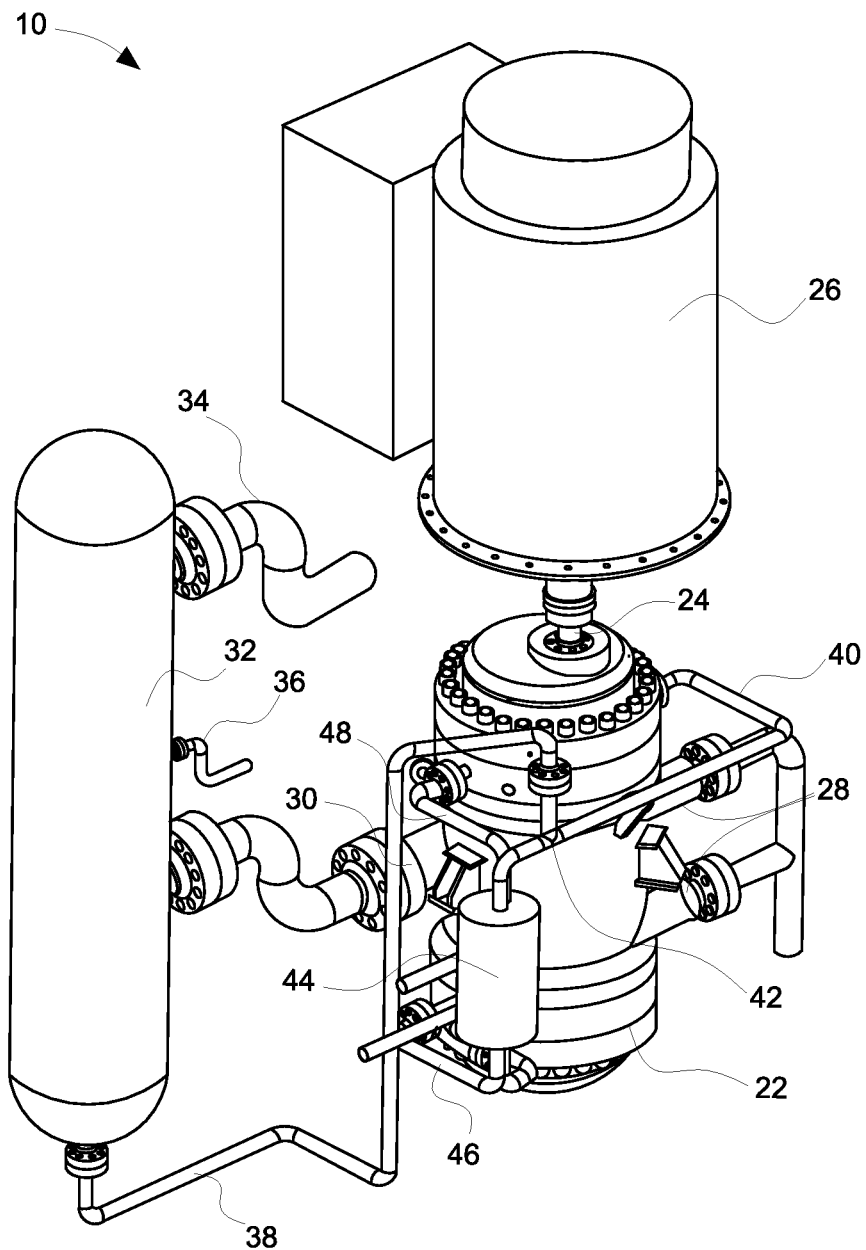
FIG. 2 is perspective view of a screw pump system, as shown in FIG. 1, including a separator, in accordance with an embodiment of the present technique.

FIG. 2 is a detailed perspective view of an embodiment of the screw pump system 10. As depicted, the screw pump system 10 includes a twin screw pump 22, which includes two screws or rotors used to direct a process fluid at a high pressure to a downstream location. In other embodiments, the screw pump 22 may include more than two screws that intermesh to pump a process fluid. One of the screws may be coupled to a driving shaft 24, which may be coupled to a motor 26. The motor 26 and the driving shaft 24 produce a rotational output used to drive a driving rotor that is coupled, via a gear, to drive a driven rotor, thereby producing the necessary pressure and force to direct the process fluid downstream. The process fluid, such as a petroleum-based multiphase fluid, may enter the twin screw pump 22 via fluid intakes 28. By rotating the meshing threads of the rotor screws, the process fluid is driven from the twin screw pump 22 via a fluid outlet 30. The fluid output may be directed to a conduit and thereby to a multiphase separator 32. The separator 32 may be configured to remove a portion of particulates from the multiphase process fluid. Further, the separator 32 may also be configured to reduce a gas content of the multiphase process fluid, thereby increasing the liquid portion of the process fluid. Alternatively, the separator 32 may be configured to remove a liquid portion of the process fluid to direct a gas portion of the process fluid downstream via a gas conduit 34. The gas conduit 34 may not only carry the gas portion of the process fluid, but may also carry solid and liquid portions in certain situations. For example, if the separator 32 is full of liquid, essentially all the process fluid entering from the twin screw pump 22 may be removed through the gas conduit. As depicted, the gas conduit 34 may be routed to a downstream device or unit, such as the production platform 12 or another processing unit. The separator 32 may be configured to direct a portion of the separated process fluid downstream via gas conduit 34 while directing a portion of the particulates of the separated process fluid to a solid conduit 36 and a liquid portion to a liquid conduit 38, which may be used to recirculate the separated multiphase process fluid. The solid conduit 36 may be sloped downward to help reduce the amount of solid accumulation. Various embodiments of the separator 32 are discussed in detail below.

In the depicted embodiment, the separated multiphase process fluid directed through conduit 38 may be joined with process fluid directed via conduit 40 from an end chamber of the screw pump system 10. As depicted, the joining of flow from conduits 38 and 40, via a joint 42, may be routed to a chamber 44 for processing. For example, chamber 44 may be used to cool the circulating lubrication flow to be routed via a conduit 46 to an end chamber of the twin screw pump 22. As depicted, the recirculation flow of a portion of the separated process fluid directed via conduit 38 is used along with a flow directed via conduit 40 to recirculate the process fluid throughout the screw pump system 10 in order to lubricate components within the system and reduce particulates within the process fluid. By removing a portion of the particulates from the recirculation flow, the multiphase separator 32 may be used to reduce downtime and wear of the screw pump system 10 components. In addition, conduit 48 may be used to circulate process fluid between the end chambers of the twin screw pump 22, wherein the conduit 48 directs a separated multiphase process fluid to lubricate pump bearings, thereby facilitating smooth operation of the twin screw pump 22. Further, although described with respect to the screw pump system 10, embodiments of the multiphase separator 32 may be used with various devices utilizing process fluid for lubrication, such as, but not limited to, turbomachinery, turbines, compressors, pumps, motors, and so forth. Examples of such pumps include, but are not limited to, helicoaxial multiphase pumps, gas tolerant centrifugal pumps, and so forth.

Figure 3:
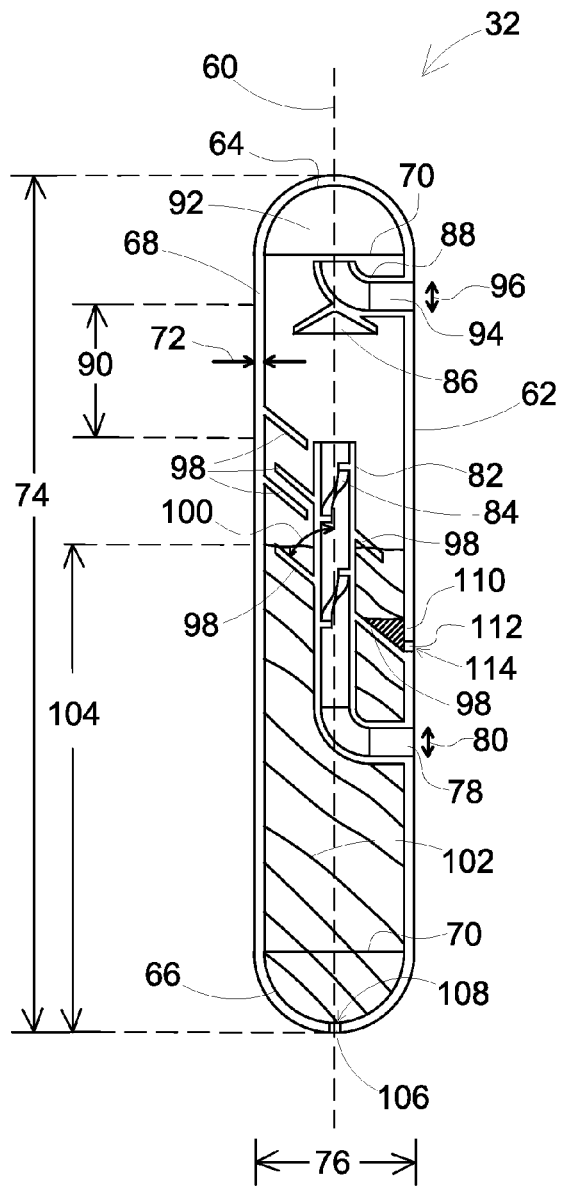
FIG. 3 is a cross-sectional view of a separator in accordance with an embodiment of the present technique.

FIG. 3 is a cross-sectional view of an embodiment of the multiphase separator 32. A longitudinal axis 60 passes through the center of the multiphase separator 32. A shell 62 serves as the enclosure of the multiphase separator 32 and may be made from various metals or metal alloys compatible with the multiphase fluid and subsea conditions. In the illustrated embodiment, the shell 62 includes a top head 64, a bottom head 66, and a cylindrical body 68. Types of shapes that may be used for the top and bottom heads 64 and 66 include, but are not limited to, flat, standard dished, torispherical, ellipsoidal, hemispherical, conical, and so forth. The upper and lower heads 64 and 66 may be coupled to the cylindrical body 68 at connections 70, which may be flanged connections, welded connections, screwed connections, or the like. The shell 62 of the multiphase separator 32 is a pressure boundary between an internal pressure caused by the boosted multiphase fluid and an external pressure caused by the weight of water at a particular depth the multiphase separator 32 is located. Thus, a sufficient thickness 72 of the shell 62 may be selected based on the internal and external pressures of a particular application. Because internal components of the multiphase separator 32 may not be exposed to subsea pressures, such thicknesses may be between approximately 20 mm to 30 mm. Including the shell 62 and internal components, a weight of the multiphase separator 32 may be between approximately 8,000 kg to 16,000 kg, depending on capacity and pressure requirements. In addition, the multiphase separator 32 has an overall height 74, measured from the top of the top head 64 to the bottom of the bottom head 66. In certain embodiments, the height 74 may be minimized to reduce the cost of the multiphase separator 32. For example, the height 74 may be between approximately 4 m to 6 m. Further, the multiphase separator 32 has a width or diameter 76, which may also be minimized to reduce the cost of the multiphase separator 32. The width 76 may be between approximately 1 m to 2 m. Thus, in certain embodiments, the height 74 and the width 76 will generally result in a multiphase separator 32 that is taller than it is wide. Such a configuration of the multiphase separator 32 may be advantageous in subsea applications, as it may improve pressure resistance, and access to and retrievability of the multiphase separator 32.

Next, the multiphase separator 32 has a multiphase feed inlet nozzle 78, which may be connected to the fluid outlet 30 of the twin screw pump 22, for example. The feed nozzle 78 has a width or outside diameter 80, which may be between approximately 150 mm to 300 mm. In certain embodiments, a feed pipe 82 may be connected internally to the feed nozzle 78 to transport the multiphase feed within the separator 32. In the illustrated embodiment, the feed pipe 82 includes a 90 degree elbow and a vertical segment, which together direct the multiphase feed in an upward direction inside the multiphase separator 32. The center of the vertical segment of the feed pipe 82 may be located near the longitudinal axis 60, which may help the multiphase feed to be evenly distributed throughout the interior of the multiphase separator 32. Located inside the feed pipe 82 may be one or more swirl elements 84, which help the multiphase feed to exit from the outlet of the feed pipe 82 in a swirling manner. The use of additional swirl elements 84 may help increase the amount of swirling of the multiphase feed. The effect of swirling the multiphase feed may be to help move liquid droplets in the multiphase feed from the center out towards interior walls of the multiphase separator 32. In addition, the positioning of the swirl element 84 a distance from the outlet of the feed pipe 82 may also affect the movement of the liquid droplets in the multiphase feed.

In the illustrated embodiment, a gas cone 86 may be located directly above the outlet of feed pipe 82 to limit the vertical extent of the swirling of the multiphase feed. Near the gas cone 86, most of the liquid in the multiphase feed may have already separated and fallen out, leaving mostly gas, which does not need to swirl. Thus, the inverted conical shape of the gas cone 86 may help to reduce swirling of the gas. Connected above the gas cone 86 may be a gas outlet pipe 88, which carries the gas separated from the multiphase feed to the gas conduit 34. In the illustrated embodiment, the gas pipe 88 includes an upward-facing 90 degree elbow to help reduce the amount of liquid entering the gas pipe 88. The opening of the gas outlet pipe 88 may be located near the longitudinal axis 60 of the multiphase separator 32 to help preferentially extract gas from the multiphase feed. In addition, a distance 90 may separate the top of the feed pipe 82 and the top of the gas cone 86. The distance 90 may be configured to provide sufficient gas-liquid separation of the multiphase feed. For example, increasing the distance 90 may improve the gas-liquid separation. As discussed in detail below, a separation efficiency between the gas and liquid phases generally need not be very high. In the illustrated embodiment, separated gas 92 may collect in the top head 64 before being carried out of the multiphase separator 32 through the gas pipe 88, which is coupled to a gas outlet nozzle 94. The gas outlet nozzle 94 may be connected to the gas conduit 34 and may have a width or outside diameter 96, which may be between approximately 150 mm to 300 mm. Because the feed pipe 82, the swirl elements 84, and/or the gas cone 86 may help to separate the gas 92 and liquid 102, they may be referred to as a gas-liquid separation device. As discussed above, if the multiphase separator 32 is full or almost full of liquid 102, essentially all of the multiphase feed (except, for example, that portion of the liquid 102 used to lubricate the twin screw pump 22) may exit the multiphase separator 32 through the gas outlet nozzle 94 and the gas conduit 34.

In the illustrated embodiment, one or more baffles 98 are located near the middle of the multiphase separator 32. The baffles 98 may help to separate the solid and liquid phases of the multiphase feed and may be attached to the interior of the cylindrical body 68, the exterior of the feed pipe 82, or both. Thus, the baffles 98 may be referred to as a solid-liquid separation device. For example, the baffles 98 may be configured to alternate between being attached to the cylindrical body 68 and the feed pipe 82. Such an alternating configuration of the baffles 98 may enable adequate separation of the solid and liquid phases of the multiphase feed, while still providing a path for gas 92 to move toward the top of the multiphase separator 32. In addition, the spacing between the baffles 98 may be adjusted to control a solid-liquid separation efficiency. In other words, increasing the spacing may help to reduce the flow rate of the liquid phase, thereby decreasing the amount of the solid phase carried into the bottom of the separator 32. In the illustrated embodiment, the baffles 98 may be oriented at an angle 100 from the longitudinal axis 60. The angle 100 may be selected to help reduce the amount of the solid phase that accumulates on the baffles 98. For example, the angle 100 may be between approximately 40 degrees to 60 degrees.

In the illustrated embodiment, liquid 102 separated from the multiphase feed by the baffles 98 may accumulate in the bottom of the multiphase separator 32. The top level of the liquid 102 may be located a distance 104 from the bottom of the bottom head 66 of the multiphase separator 32. The distance 104 may vary during operation of the multiphase separator 32 depending on variables such as, but not limited to, the liquid content of the multiphase feed, the flow rate of the liquid 102 removed from the multiphase separator 32, and/or separation efficiencies. In the illustrated embodiment, a liquid outlet nozzle 106 is located at the bottom of the bottom head 66 near the longitudinal axis 60. The liquid outlet nozzle 106 may have a width or outside diameter 108, which may be between approximately 25 mm to 50 mm. The selection of the diameter 108 may depend on the lubrication requirements of the multiphase pump 22. For example, a smaller diameter 108 may cause the liquid 102 to flow out of the multiphase separator 32 to the lubricated components of the multiphase pump 22 at a lower flow rate, thereby increasing the time the multiphase pump 22 may operate when the multiphase feed has no liquid phase, as described in detail below. In addition, the liquid outlet nozzle 106 may be connected to the liquid conduit 38, the diameter of which may be selected to enable a specified flow rate of the liquid 102 to flow to the lubricated components of the multiphase pump 22.

In the illustrated embodiment, solid 110 separated from the multiphase feed by the baffles 98 may accumulate near the bottom of the lowest baffle 98, on the upper surface of the baffle 98. The solid 110 may be removed from the multiphase separator 32 through a solid outlet nozzle 112, which may have a width or outside diameter 114. For example, the diameter 114 may be between approximately 25 mm to 50 mm. The diameter 114 may be selected to help reduce the amount of the solid 110 accumulating inside the multiphase separator 32 and entering the liquid 102 and/or gas 92. In addition, the solid outlet nozzle 112 may be connected to the solid conduit 36. The configuration of the baffles 98, such as baffle spacing and/or baffle orientation, may be adjusted to facilitate movement of the solid 110 toward the solid outlet nozzle 112.

The illustrated embodiment of the multiphase separator 32 includes no moving parts, and thus, may be described as a passive separation system. In other words, separation of the multiphase feed is accomplished using static, non-moving components of the separator 32, such as the feed pipe 82 and the baffles 98. In other embodiments, active components, such as valves, may be added to the separator 32. However, such active components may be susceptible to the effects of particulate matter and thus, may be omitted. In addition, active components may be more difficult to maintain and repair because of the relative inaccessibility of the subsea floor. Thus, active components may be combined with embodiments of the separator 32 to serve as backup elements or enhancement of the passive separation system.

Figure 4:
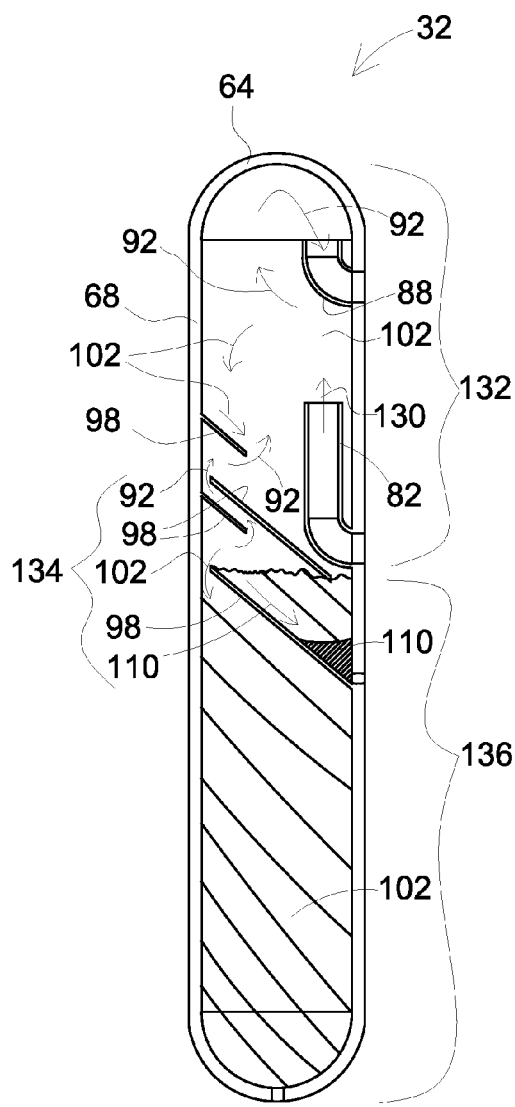
FIG. 4 is a cross-sectional view of another separator in accordance with an embodiment of the present technique.

FIG. 4 is a cross-sectional view of another embodiment of the multiphase separator 32, which also shows examples of flow directions inside the separator 32. Elements in FIG. 4 in common with those shown in FIG. 3 are labeled with the same reference numerals. In the illustrated embodiment, a multiphase feed 130 exits out the top of the multiphase feed pipe 82, which is located closer to one side of the cylindrical body 68 than the other. Such a configuration of the feed pipe 82 may affect the circulation patterns in the multiphase separator 32 and possibly separation efficiencies. Correspondingly, the gas outlet pipe 88 may be located closer to one side of the cylindrical body 68 than the other. In the illustrated embodiment, the gas from the multiphase feed 130 moves around the gas outlet pipe 88 and turns in the upper head 64 to enter the gas outlet pipe 88. The upper section of the multiphase separator 32 may be referred to as a gas-liquid separation zone 132, which may use various technologies, such as, but not limited to, cyclonic strategies, separation devices, swirling, inlet pipe orientation, and so forth, to separate the gas and liquid phases. Selection of the appropriate technology for the gas-liquid separation zone 132 may depend on various considerations, such as minimizing the pressure drop of the gas-liquid separation zone 132. Further, in certain embodiments, only a small amount of liquid extraction may be performed in the gas-liquid separation zone 132. In other words, in such embodiments, the separation efficiency of the gas-liquid separation zone 132 may be limited. For example, if the multiphase separator 32 is relatively full of liquid 102, good gas-liquid separation may not be needed. Instead, it may be desirable for the gas 92 to help carry additional liquid 102 out of the multiphase separator 32. As a further example, if the multiphase feed 130 includes relatively little gas, expressed as a low gas volume fraction (GVF), good gas-liquid separation may also not be needed. Thus, there may be a small window in which good gas-liquid separation efficiency is helpful, namely, when the multiphase separator 32 is relatively empty of liquid 102 or the multiphase feed 130 has a high GVF.

In the illustrated embodiment, solid-liquid separation occurs in the middle of the multiphase separator 32, which may be referred to as a solid-liquid separation zone 134. In the solid-liquid separation zone 134, liquid 102 moves from baffle 98 to baffle 98, spills over the lowest baffle 98, and accumulates in the bottom of the multiphase separator 32. Solid 110 may move from baffle 98 to baffle 98, separate from the liquid 102, and accumulate near the bottom of the lowest baffle 98. In addition, any gas 92 evolved from the accumulated liquid 102 may move upward through the baffles 98 and accumulate near the top of the multiphase separator 32.

The bottom of the illustrated embodiment of the multiphase separator 32 accumulates a volume of liquid 102 and thus, may be referred to as a liquid reservoir 136. The liquid reservoir 136 may be sized to provide sufficient liquid for lubrication of the multiphase pump 22 for a period of time when the multiphase feed 130 is all or substantially all gas. In other words, during this time, the multiphase feed 130 may have a GVF of 1 or nearly 1. Thus, the level of the liquid reservoir 136 may gradually fall during this time as little to no liquid 102 enters the multiphase separator 32 from the multiphase feed 130. If the liquid reservoir 136 empties, the multiphase pump 22 may no longer be adequately lubricated. In certain embodiments, the liquid reservoir 136 may be sized to enable the multiphase pump 22 to operate when the multiphase feed 130 has little to no liquid for a period of at least approximately 30 minutes. In other words, the liquid reservoir 136 is configured with a volume large enough to supply the liquid 102 to the lubricated components of the multiphase pump 22 for the specified period of time. In addition, the multiphase separator 32 may include level gages to indicate the level of the liquid 102 in the liquid reservoir 136. Technologies that may be used to measure the level of the liquid 102 in the liquid reservoir 136 include, but are not limited to, differential pressure, magnetostrictive, gamma ray, and so forth.

FIG. 5 is a cross-sectional view of a multiphase separator 32 with an eductor 152. Elements in FIG. 5 in common with those shown in FIG. 3 are labeled with the same reference numerals. In the illustrated embodiment, the liquid reservoir 136 is sized to provide lubrication to the lubricated components of the multiphase pump 22 when the multiphase feed 130 has little to no liquid for a specified period of time as described in detail above. In addition, a pocket of gas 92, which may result from gas 92 released from the liquid reservoir 136, may form under some of the baffles 98 in the illustrated embodiment. Thus, a gas vent 150 may be provided near the highest elevation of one or more baffles 98 to enable the gas 92 to flow to the top of the multiphase separator 32, thereby reducing the possibility of gas locking of the separator 32. In certain embodiments, the gas vent 150 may be configured as an inverted u-shaped pipe. The buoyancy of the gas in the inverted u-shape of the gas vent 150 may enable gas 92 to flow out of the gas vent 150, but may reduce the amount of liquid 102 and/or solid 110 flowing back through the gas vent 150. Thus, the gas vent 150 may not negatively affect separation of the solid 110. In addition, other approaches may be used to enable removal of trapped gas 92, such as check valves or other piping configurations. Although not shown in the embodiments illustrated in FIGS. 3 and 4, the gas vent 150 may be included in those embodiments and also in subsequent embodiments.

In the illustrated embodiment, the gas conduit 34 and the solid conduit 36 are joined together to form the eductor 152. In certain embodiments, the eductor 152 may produce a vacuum using the Venturi effect or aspiration. For example, the flow of gas 92 through the gas conduit 34 may help to pull the solid 110 through the solid conduit 36. Thus, an outlet flow 154 from the eductor 152 may include both gas 92 and solid 110. The use of the eductor 152 may help the solid 110 to be removed at a faster rate and/or with less chance of plugging than through the use of gravity alone. In addition, valves may be included in the gas conduit 34, solid conduit 36, and/or eductor 152 to control the operation of the eductor 152. For example, a valve in the gas conduit 34 may be used adjust the flow rate of the gas 92 and thereby, adjust the flow rate of the solid 110 removed through the solid conduit 36. Finally, the solid conduit 36 may slope downward to further reduce the amount of accumulation of the solid 110 in the solid conduit 36.

FIG. 6 is a cross-sectional view of a multiphase separator 32 with a solid separation cone system 170, which is another example of the solid-liquid separation device. Elements in FIG. 6 in common with those shown in FIG. 3 are labeled with the same reference numerals. In the illustrated embodiment, the liquid reservoir 136 is sized to provide lubrication to the lubricated components of the multiphase pump 22 when the multiphase feed 130 has little to no liquid for a specified period of time as described in detail above. In addition, the multiphase feed inlet nozzle 78 is configured at an incline to the cylindrical body 68 in the illustrated embodiment. In other words, the multiphase feed 130 may be directed in a downward manner from the feed nozzle 78. In addition, the feed nozzle 78 is located tangentially on the cylindrical body 68. In other words, the multiphase feed 130 may be directed toward the wall of the cylindrical body 68 instead of toward the longitudinal axis 60. Such a configuration for the feed nozzle 78 may enable the liquid 102 in the multiphase feed 130 to centrifuge toward the walls of the cylindrical body 68. In addition, such a configuration may reduce the amount of the liquid 102 impinging on the feed nozzle 78 after making one revolution around the cylindrical body 68 and interfering with the flow of the multiphase feed 130 into the multiphase separator 32. As the liquid 102 swirls down the walls of the cylindrical body 68, the gas 92 may rise up through the center of the cylindrical body 68 to the top of the separator 32. Because the configuration of the feed nozzle 78 helps to effect separation of gas 92 and liquid 102, the feed nozzle 78 is another example of the gas-liquid separation device. The configuration of the gas outlet pipe 88 may be similar to that of previous embodiments. On the other hand, the solid outlet nozzle 112 is located at the bottom of the bottom head 66 instead of the cylindrical body 68 as with previous embodiments. Thus, the solid 110 may accumulate near the bottom of the multiphase separator 32. Specifically, the solid separation cone system 170 may be used to separate solid 110 from liquid 102, as described in detail below. In the illustrated embodiment, the bottom head 66 includes a clean flush nozzle 172, which may be used to circulate clean flush, as described in detail below. Because solid 110 accumulates in the solid separation cone system 170, the liquid outlet nozzle 106 is located on the cylindrical body 68 above the solid separation cone system 170.

Figure 7:
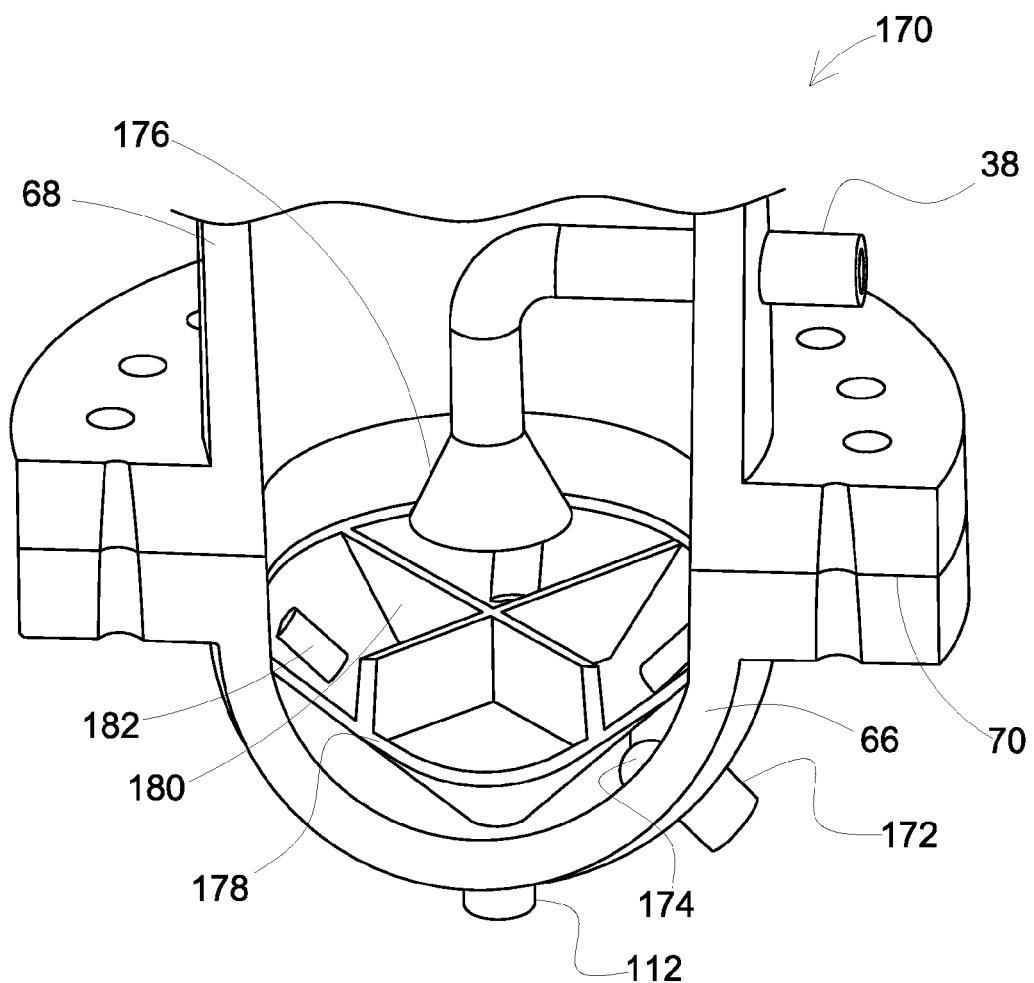
FIG. 7 is a partial perspective view of a solid separation cone system of a separator in accordance with an embodiment of the present technique.

FIG. 7 is a partial perspective view of an embodiment of the solid separation cone system 170. Elements in FIG. 7 in common with those shown in FIG. 6 are labeled with the same reference numerals. In the illustrated embodiment, the bottom head 66 is attached to the cylindrical body 68 with a flanged connection 70. Unlike a welded connection 70, a flanged connection 70 may facilitate opening of the multiphase separator 32 for maintenance, which may include removal and/or repair of the solid separation cone system 170. Located opposite the clean flush nozzle 172 on the interior surface of the bottom head 66 is a clean flush guide 174, which helps to direct a flow of the clean flush in the space above the bottom head 66. The clean flush guide 174 may be configured as half of a cylinder and closed on one end. In certain embodiments, the clean flush may include liquid 102, which is used to sweep or flush solid 110 that may have accumulated on the interior surface of the bottom head 66. Located above the solid separation cone system 170 is a liquid cone 176, which may be attached to the liquid outlet nozzle 106 via piping that carries liquid 102 to the liquid conduit 38. The inverted conical shape of the liquid cone 176 may help to reduce the amount of ingestion of solid 110 by the liquid 102 flowing out of the multiphase separator 32.

In the illustrated embodiment, the solid separation cone system 170 also includes a solid cone 178, which collects the solid 110. The conical shape of the solid cone 178 may help direct solid 110 to the bottom of the solid cone 178 for removal. Specifically, the bottom of the solid cone 178 may be flush with the interior surface of the bottom head 66 to reduce the amount of solid 110 accumulating in the space between the solid cone 178 and the bottom head 66. In certain embodiments, a vortex breaker 180 may be attached to the interior surface of the solid cone 178 to help dissipate swirling and enable separation of solid 110 from liquid 102. In other embodiments, the interior of the solid cone 178 may include one or more solid flushing nozzles 182, which provide an outlet for the clean flush from the clean flush nozzle 172. Thus, solid 110 in the space between the solid cone 178 and bottom head 66 may be carried by the clean flush through the solid flushing nozzles 182 and into the solid cone 178. The solid flushing nozzles 182 may also provide venting of the space between the solid cone 178 and the bottom head 66 and may help to reduce the amount of small particles of solid 110 back flowing into that space.

Figure 8:
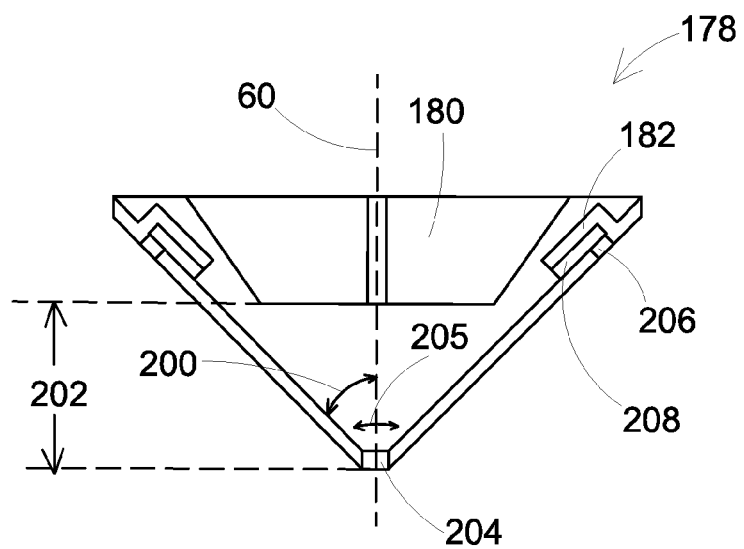
FIG. 8 is cross-sectional view of a solid cone in accordance with an embodiment of the present technique.

FIG. 8 is a cross-sectional view of the cone 178, which further illustrates certain structural elements of the solid cone 178. Elements in FIG. 8 in common with those shown in FIG. 7 are labeled with the same reference numerals. In the illustrated embodiment, the solid cone 178 is symmetrical about the longitudinal axis 60. In addition, the walls of the solid cone 178 are oriented at an angle 200 from the longitudinal axis 60. The angle 200 may be selected to enable the solid 110 to flow down the interior walls of the solid cone 178. For example, the angle 200 may be between approximately 40 degrees to 60 degrees. Further, the vortex breaker 180 extends only part way through the solid cone 178. Specifically, a distance 202 separates the bottom of the vortex breaker 180 from the bottom of the solid cone 178. For example, the distance 202 may be approximately half of the overall height of the cone 178. In the illustrated embodiment, a solid slurry outlet nozzle 204 is located at the bottom tip of the solid cone 178, to enable solid 110 to be removed from the solid cone 178. A diameter 205 of the solid slurry outlet nozzle 204 may be approximately the same as the diameter 114 of the solid outlet nozzle 112. For example, the diameter 205 may be between approximately 25 mm to 50 mm. In addition, the solid slurry outlet nozzle 204 may be flush with the solid outlet nozzle 112 to help reduce the amount of solid 110 entering the space between the solid cone 178 and the bottom head 66. In the illustrated embodiment, the solid flushing nozzles 182 are located on interior surfaces of the solid cone 178 to help reduce the amount of back flow of solid 110 into the space between the solid cone 178 and the bottom head 66. In addition, the solid flushing nozzles 182 may be configured to direct the clean flush toward the solid slurry outlet nozzle 204. Located opposite from the solid flushing nozzles 182 and on the exterior surface of the solid cone 178 are flushing inlets 206, which enable the clean flush to enter the interior of the solid cone 178. A gap 208 may exist between the solid flushing nozzle 182 and the flushing inlets 206, which may be configured to enable a specified flow rate of clean flush to pass through the gap 208.

Figure 9:
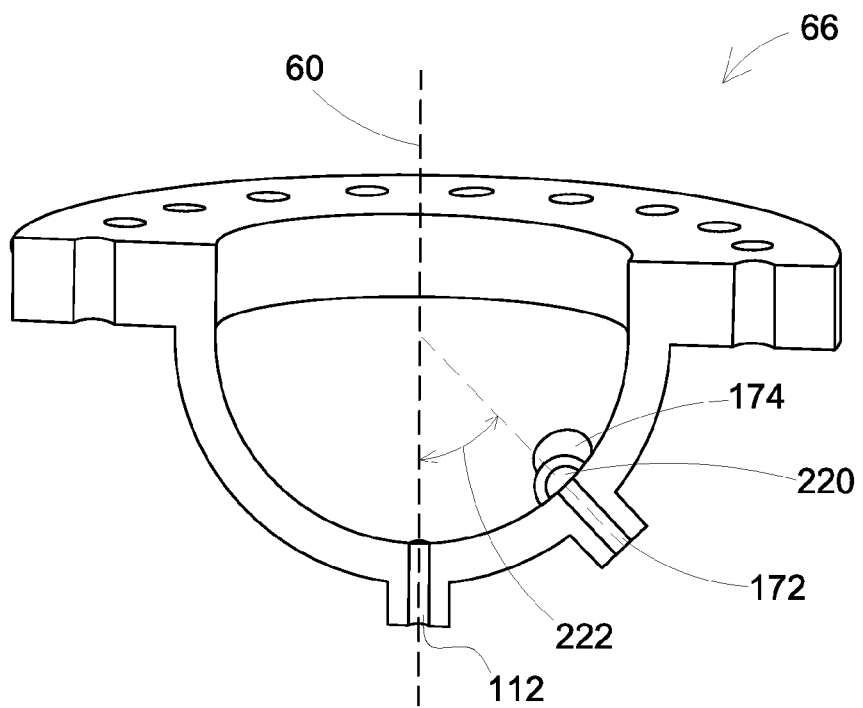
FIG. 9 is a partial perspective view of a bottom head of a separator in accordance with an embodiment of the present technique.

FIG. 9 is a partial perspective view of the bottom head 66 of the multiphase separator 32 that may be used with the solid separation cone system 170. In the illustrated embodiment, the bottom head 66 is symmetric about the longitudinal axis 60. The solid outlet nozzle 112 is located at the bottom of the bottom head 66 and near the longitudinal axis 60. The clean flush nozzle 172 is located at an angle 222 from the longitudinal axis 60. The angle 222 may be selected to enable adequate flushing of the space between the solid cone 170 and the bottom head 66. For example, the angle 222 may be approximately 45 degrees. In the illustrated embodiment, the clean flush guide 174 is configured to direct the clean flush in a tangential swirling manner around the bottom head 66, which may help to sweep most of the interior surface of the bottom head 66. In addition, a gap 220 exists between the clean flush nozzle 172 and the clean flush guide 174, which may be configured to enable a specified flow rate of clean flush to pass through the gap 220.

Figure 10:
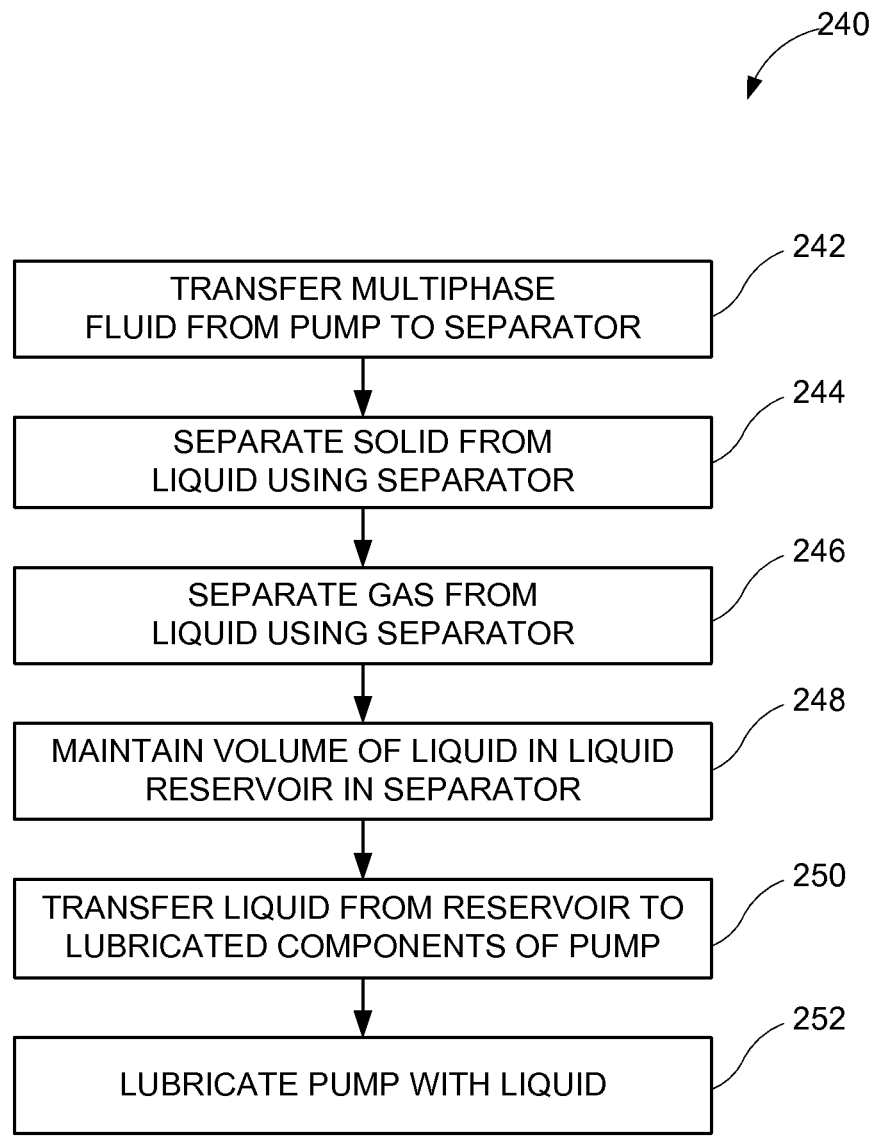
FIG. 10 is a flow chart of a process for operating a separator in accordance with an embodiment of the present technique.

FIG. 10 shows a flow chart of a process 240 that may be used to operate the multiphase separator 32 to lubricate the multiphase pump 22. In a step 242, the multiphase feed 130 may be transferred from the pump 22 to the multiphase feed inlet nozzle 78 of the separator 32 via the fluid outlet 30. In a step 244, the separator may facilitate separation of solid 110 from liquid 102 using a solid-liquid separation device disposed in the shell 62 of the separator 32, such as baffles 98 or the solid separation cone system 170. In a step 246, the separator may facilitate separation of gas 92 from liquid 102 using a gas-liquid separation device disposed in the shell 62 of the separator 32, which may include the feed pipe 82 or the feed nozzle 78. In a step 248, the separator 32 may maintain a volume of liquid 102 in the liquid reservoir 136 located in the shell 62 of the separator 32. The volume of liquid 102 in the liquid reservoir 136 may enable the pump 22 to operate for a specified time period during which the multiphase feed 130 has substantially no liquid 102. In a step 250, the liquid 102 from the liquid reservoir 136 may be transferred to lubricated components of the pump 22, which may include bearings and/or timing gears, for example. Finally, in a step 252, the lubricated components of the pump 22 may be lubricated with the liquid 102 from the liquid reservoir 136.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A subsea system, comprising:
    a multiphase pump, configured to transfer a multiphase fluid; and
    a multiphase separator, configured to separate the multiphase fluid into solid, liquid, and gaseous phases, comprising:
        a multiphase fluid inlet coupled to a shell, wherein the multiphase fluid inlet is configured to receive the multiphase fluid from the multiphase pump;
        a solid-liquid separation device disposed in the shell, wherein the solid-liquid separation device is configured to facilitate separation of the solid phase and the liquid phase from the multiphase fluid;
        a gas-liquid separation device disposed in the shell, wherein the gas-liquid separation device is configured to facilitate separation of the gaseous phase and the liquid phase from the multiphase fluid;
        a liquid reservoir disposed in the shell, wherein the liquid reservoir is configured to hold a volume of the liquid phase to be used as a lubricant for the multiphase pump; and
        a liquid outlet coupled to the shell, wherein the liquid outlet is configured to transfer the liquid phase from the liquid reservoir to the multiphase pump.

2. The system of claim 1, wherein the shell of the multiphase separator is configured with a height greater than a width.

3. The system of claim 1, wherein the solid-liquid separation device comprises a baffle oriented at an angle from a longitudinal axis of the multiphase separator.

4. The system of claim 3, wherein the angle between the baffle and the longitudinal axis of the multiphase separator is less than approximately 45 degrees.

5. The system of claim 3, comprising a gas vent coupled to the baffle, configured to enable the gas phase to vent from under the baffle.

6. The system of claim 1, wherein the solid-liquid separation device comprises a vortex breaker.

7. The system of claim 1, wherein the gas-liquid separation device comprises an upwardly-facing outlet nozzle.

8. The system of claim 1, wherein the shell is configured to operate at a subsea pressure.

9. The system of claim 1, comprising,
    a solid outlet coupled to the shell, wherein the solid outlet is configured to remove the solid phase from the multiphase separator; and
    a gaseous outlet coupled to the shell, wherein the gaseous outlet is configured to remove the gaseous phase from the multiphase separator.

10. The system of claim 9, comprising an eductor coupled to the solid outlet and the gaseous outlet, configured to aspirate the solid phase using the gaseous phase.

11. A subsea system, comprising:
a multiphase separator, configured to separate a multiphase fluid into solid, liquid, and gaseous phases, comprising:
- a multiphase fluid inlet coupled to a shell, wherein the multiphase fluid inlet is configured to receive the multiphase fluid;
- a solid-liquid separation device disposed in the shell, wherein the solid-liquid separation device is configured to facilitate separation of the solid phase and the liquid phase from the multiphase fluid;
- a gas-liquid separation device disposed in the shell, wherein the gas-liquid separation device is configured to facilitate separation of the gaseous phase and the liquid phase from the multiphase fluid;
- a liquid reservoir disposed in the shell, wherein the liquid reservoir is configured to contain a volume of the liquid phase to be used as a lubricant for a pump; and
- a liquid outlet coupled to the shell, wherein the liquid outlet is configured to transfer the liquid phase from the liquid reservoir to the pump.

12. The system of claim 11, wherein the solid-liquid separation device comprises a baffle oriented at an angle from a longitudinal axis of the multiphase separator.

13. The system of claim 11, wherein the liquid outlet is configured to couple with bearings or timing gears of the pump.

14. A method of operating a subsea system, comprising:
- transferring a multiphase fluid from an outlet of a multiphase pump to an inlet of a multiphase separator;
- facilitating separation of a solid phase and a liquid phase from the multiphase fluid using a solid-liquid separation device disposed in a shell of the multiphase separator;
- facilitating separation of a gas phase and the liquid phase from the multiphase fluid using a gas-liquid separation device disposed in the shell of the multiphase separator;
- maintaining a volume of the liquid phase in a liquid reservoir disposed in the shell of the multiphase separator;
- transferring the liquid phase from the liquid reservoir to lubricated components of the multiphase pump; and
- lubricating the lubricated components of the multiphase pump with the liquid phase.

15. The method of claim 14, wherein the volume of the liquid phase maintained in the liquid reservoir enables the multiphase pump to operate for a time period during which the multiphase fluid has no liquid phase by supplying the liquid phase to the lubricated components of the multiphase pump.

16. The method of claim 14, wherein the separation of the solid phase, the liquid phase, and the gaseous phase from the multiphase fluid is performed passively with no moving parts in the solid-liquid separation device or the gas-liquid separation device.

* * * * *